March 3, 1970     D. F. MAREAN     3,498,271
ROTARY ENGINE Filed March 18, 1968     6 Sheets-Sheet 1

INVENTOR.
DALE F. MAREAN
BY
ATTORNEYS

March 3, 1970 D. F. MAREAN 3,498,271
ROTARY ENGINE

Filed March 18, 1968 6 Sheets-Sheet 2

INVENTOR
DALE F. MAREAN
BY
ATTORNEYS

March 3, 1970  D. F. MAREAN  3,498,271
ROTARY ENGINE

Filed March 18, 1968  6 Sheets-Sheet 3

INVENTOR
DALE F. MAREAN
BY
ATTORNEYS

March 3, 1970     D. F. MAREAN     3,498,271

ROTARY ENGINE

Filed March 18, 1968     6 Sheets-Sheet 4

INVENTOR
DALE F. MAREAN

BY
ATTORNEYS

March 3, 1970     D. F. MAREAN     3,498,271
ROTARY ENGINE Filed March 18, 1968     6 Sheets-Sheet 5

INVENTOR
DALE F. MAREAN

BY
ATTORNEYS

March 3, 1970     D. F. MAREAN     3,498,271
ROTARY ENGINE Filed March 18, 1968     6 Sheets-Sheet 6

INVENTOR
DALE F. MAREAN
BY
ATTORNEYS

# United States Patent Office 3,498,271
Patented Mar. 3, 1970

3,498,271
ROTARY ENGINE
Dale F. Marean, 1626 1st St., Manhattan
Beach, Calif. 90266
Filed Mar. 18, 1968, Ser. No. 713,608
Int. Cl. F02b 3/02, 55/00
U.S. Cl. 123—13          6 Claims

ABSTRACT OF THE DISCLOSURE

A rotary engine that includes a housing having a circular chamber within which rotates a master rotor having at least one vane projecting outwardly to the wall of the chamber. Additional smaller rotors are rotatable with the master rotor and extend into recesses defined by circular segments off the main chamber. The smaller rotors are recessed so that the vane may pass through the recesses and pass the smaller rotors as the master rotor turns. One of the rotors includes a larger recess adapted to seal around the periphery of the vane and to receive gases compressed forwardly of the vane as the vane is moved toward the rotor. These gases are transferred from the recess of the rotor to the rearward side of the vane, where they may be ignited to drive the rotor forwardly.

BACKGROUND OF THE INVENTION

Field of the invention

This invention relates to rotary engines and compressors.

The prior art

Rotary engines offer attractive possibilities for efficient operation due to their predominantly continuous rotary motion and fewer moving parts than found in the conventional reciprocating engine. Accordingly, many rotary engines have been designed in the past. However, generally, these have not lived up to expectations. One severe problem has been encountered with the sealing around the rotary elements to prevent leakage of the compressed and ignited gases. The sealing problem has been made more difficult by the fact that many rotary engine designs do not place the rotors in circular chambers, but instead require sealing at various locations in noncircular chambers. Also, many bring in changes in the velocity of the moving parts and problems of achieving dynamic balance. While simpler than conventional reciprocating engines, some rotary engines have become relatively complex and still include a good many moving parts. Some provide for reciprocation or oscillation of parts, sacrificing the simplicity and efficiency of pure rotary motion.

SUMMARY OF THE INVENTION

The present invention provides a particularly simple rotary engine where the parts are turned at constant speed, are perfectly balanced and maintained in circular chambers. The latter means that sealing is not difficult. The invention includes a circular chamber within which is a master rotor, having, typically, three vanes or lobes projecting outwardly from it. Also provided are two smaller rotors, which turn with the master rotor. They are received in recesses off the main circular chamber, which also are defined by circular segments. The smaller rotors are recessed, which permits the vanes to pass through the smaller rotors as the master rotor turns. One of the rotors provides a recess of larger dimension and is adapted to seal around the vane as it passes through. The recess in this rotor receives the compressed gases as the vane moves, transferring them from the forward side of the vane to the rearward side. There, they are exploded to drive the vane and, hence, the master rotor forwardly.

With one of the rotors eliminated, the device also serves as a compressor.

An object of this invention is to provide a rotary engine of simplified construction with a minimum number of moving parts.

Another object of this invention is to provide a rotary engine in which the parts move in circular chambers, simplifying the sealing of the engine.

A further object of this invention is to provide a rotary engine in which the parts move at constant velocity and are dynamically balanced.

An additional object of this invention is to provide a rotary engine that is efficient in its operation.

Yet another object of this invention is to provide a rotary engine that can provide a complete four-cycle operation during one rotation of the master rotor.

These and other objects will become apparent from the following detailed description taken in connection with the accompanying drawing.

DESCRIPTION OF THE PREFERRED EMBODIMENT

Figures 1, 4, 26:
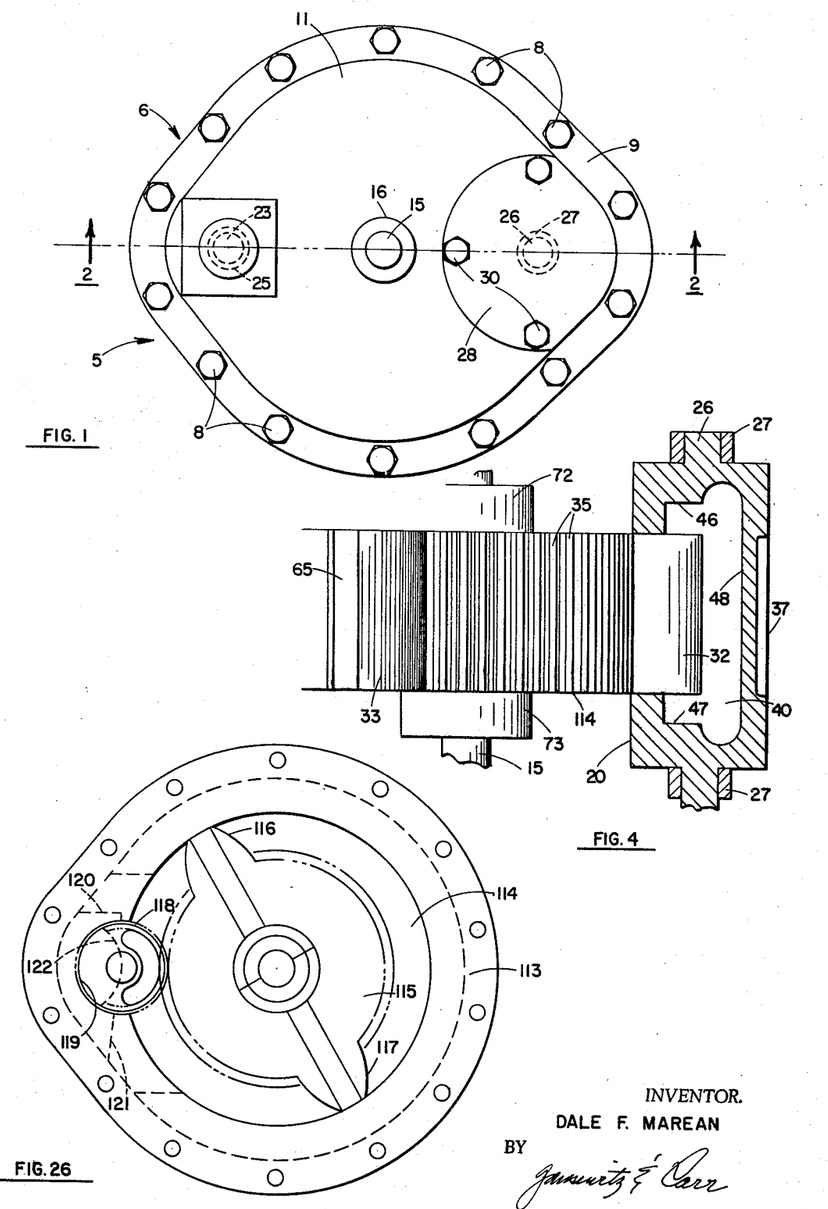
FIGURE 1 is a plan view of the device of this invention.
FIGURE 4 is a fragmentary sectional view, partially in elevation, illustrating the movement of the lobe of the master rotor into the recess of the valve rotor.
FIGURE 26 is a plan view, with one section of the case removed, of the invention modified to serve as a compressor.
Figure 2:
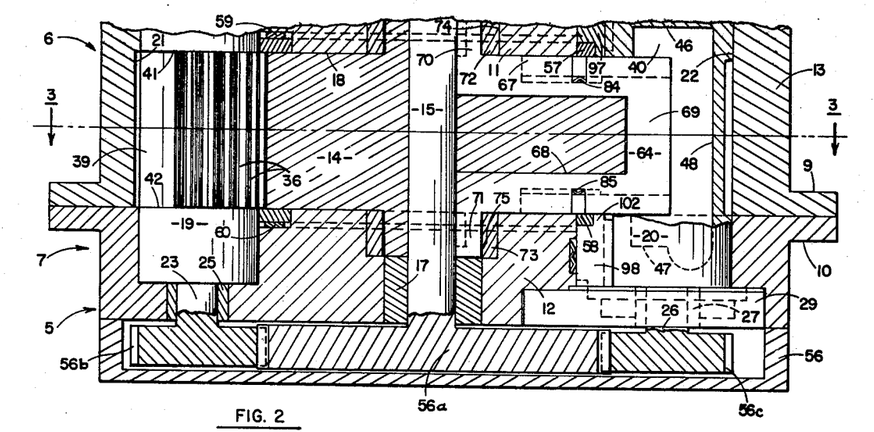
FIGURE 2 is an enlarged fragmentary sectional view taken along line 2—2 of FIGURE 1.
Figure 3:
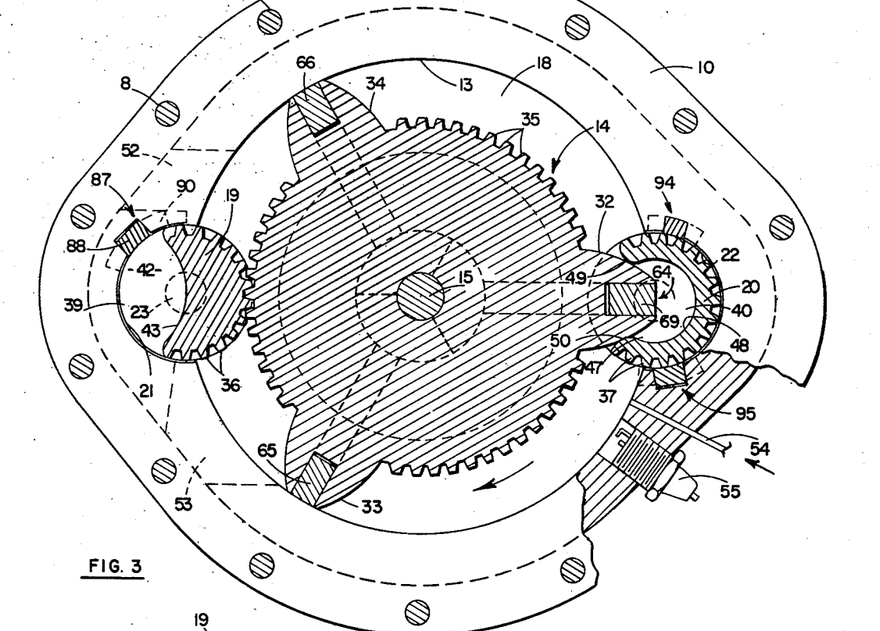
FIGURE 3 is a sectional view, partially broken away, taken along line 3—3 of FIGURE 2.
Figure 5:
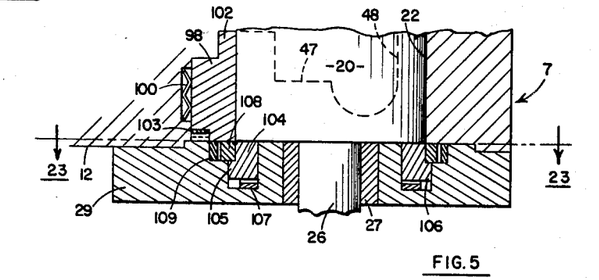
FIGURE 5 is an enlarged fragmentary sectional view showing the construction at one end of the valve rotor.
Figure 6:
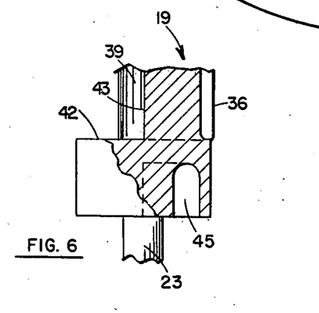
FIGURE 6 is a fragmentary sectional view, partially in elevation, of the scavenge rotor.
Figure 7:
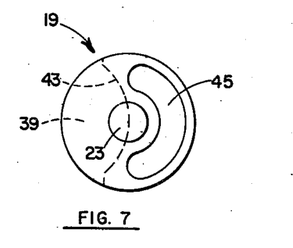
FIGURE 7 is an end view of the scavenge rotor.
Figure 8:
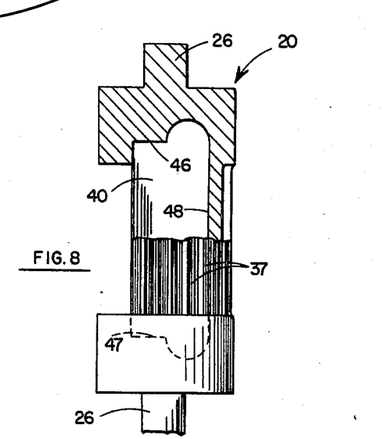
FIGURE 8 is a side elevational view, partially broken away, of the valve rotor.

With particular reference to FIGURES 1, 2 and 3, the engine of this invention includes a housing 5 made up of two sections 6 and 7 secured together by bolts 8 extending through flanges 9 and 10. Together, the sections 6 and 7 of the housing define end walls 11 and 12 and a circumferential wall 13.

Within the housing is a master rotor 14, which is connected to a shaft 15 that constitutes the power takeoff for the engine. The shaft 15 extends through the end walls 11 and 12, where it is mounted in bearings 17. The master rotor 14 is received in a cylindrical chamber 18 in the housing 5.

Also included in the housing 5 are a smaller scavenge rotor 19 and a similarly dimensioned valve rotor 20. The rotors 19 and 20 extend parallel to the drive shaft 15 and are received in arcuate recesses 21 and 22, respectively, formed in the peripheral wall 13 of the housing. These recesses are defined by cylindrical sections that communicate at their central portions with the chamber 18. The scavenge rotor 19 includes journals 23 at its ends mounted in bearings 25 in the housing end walls 11 and 12. Similarly, journals 26 of the valve rotor 20 extend into bearings 27. The journals and bearings of the valve rotor 20 are received in plates 28 and 29 and secured by screws 30 to the end walls 11 and 12.

The master rotor 14 is provided with three lobes or vanes 32, 33 and 34 projecting outwardly beyond its circumferential wall and equally spaced apart. The rotor 14 with its outwardly projecting lobes is symmetrical and inherently balanced. Other than at the lobes 32, 33, and 34, the master rotor 14 has a circular contour provided with gear teeth 35 on its periphery. The lobes 32, 33 and 34 have somewhat the shape of gear teeth, having arcuate outwardly convergent sidewalls. The smaller rotors 19 and 20 also are of circular contour with teeth 36 on the rotor 19 being adapted to mesh with the teeth 35, while teeth 37 on the rotor 20 also are adapted for engagement with the teeth 35. These teeth are on the central portions of the rotors 19 and 20 at the chamber 18, the rotors being cylindrical outwardly of the chamber. The meshing of the teeth 36 and 37 with the teeth 35 of the master rotor 14 produces a labyrinth seal where the rotors 19 and 20 meet the master rotor 14. These teeth serve only as seals and do not form a driving connection among the rotors.

Recesses 39 and 40 in the rotors 19 and 20, respectively, are adapted to receive the lobes 32, 33 and 34 upon rotation of the master rotor 14. The recess 39 in the rotor 19 includes end surfaces 31 and 42 which are spaced apart a distance substantially equal to the thickness of the lobes 32, 33 and 34 of the master rotor 14. The arcuate inner wall 43 of the recess 39 is contoured such that the outer edge portions of the lobes 32, 33 and 34 will extend to it as the lobes pass through the rotor 19. This blocks the flow of gases around the tip of the lobe at the rotor 19.

Additional recesses 45 are provided in the two outer end surfaces of the rotor 19 for counterbalancing purposes. In other words, the recesses 45 remove some of the mass of the rotor 19 opposite from the recess 39 so that the rotor 19 is in dynamic balance.

The recess 40 in the rotor 20 is larger than the recess 39 in the rotor 19. Its end surfaces 46 and 47 have a greater spacing between them than the thickness of the lobes 32, 33 and 34. Also, the arcuate inner wall 48 of the recess 40 is spaced from the tips of the lobes as the lobes pass through the rotor recess 40. The extension of the recess 40 to a length greater than the thickness at its entrance allows the rotor 20 to be constructed so that it is dynamically balanced. The edges 49 and 50 at the entrance to the recess 49 are curved and spaced apart a distance such that when the lobe is in the recess 40 the edges engage the sidewalls of the lobe (see FIGURE 3).

Communication with the chamber 18 of the housing 5 is provided by an intake port 52 on one side of the scavenge rotor 19. An exhaust port 53 is on the opposite side of the scavenge rotor. Located next to the valve rotor 20 and on the same side of the housing as the exhaust port 53 is a fuel inlet line 54 adjacent which is a spark plug 55.

The rotors 14, 19 and 20 are externally geared together to cause them to rotate simultaneously in the proper relationship. A gear box 56 (shown in FIGURE 2) is provided for this purpose. It includes a gear 56a on the rotor shaft 15, meshing with a gear 56b on the journal 23 of the rotor 19, and a gear 56c on the journal 26 of the rotor 20.

Figure 9:
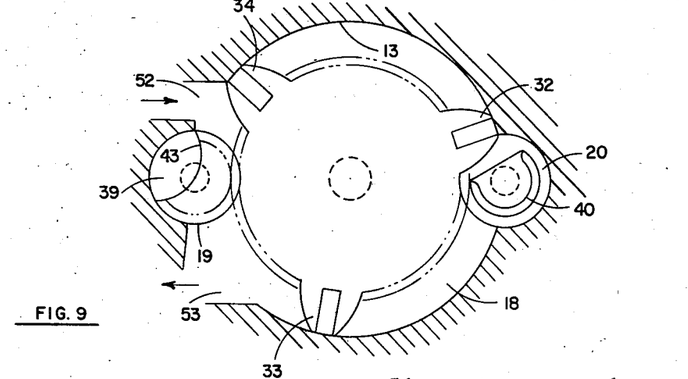
FIGURES 9, 10 and 11 are schematic views illustrating the sequence of operation of the engine.
Figure 10:
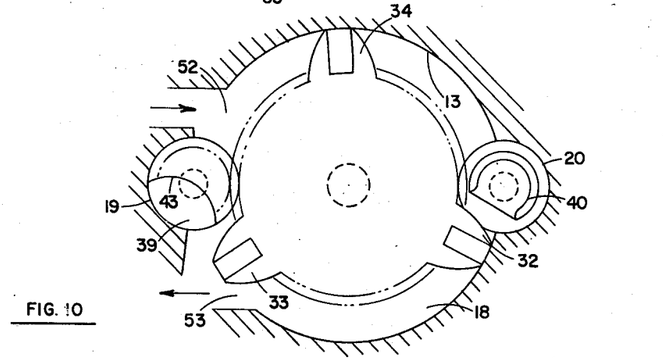
Figure 11:
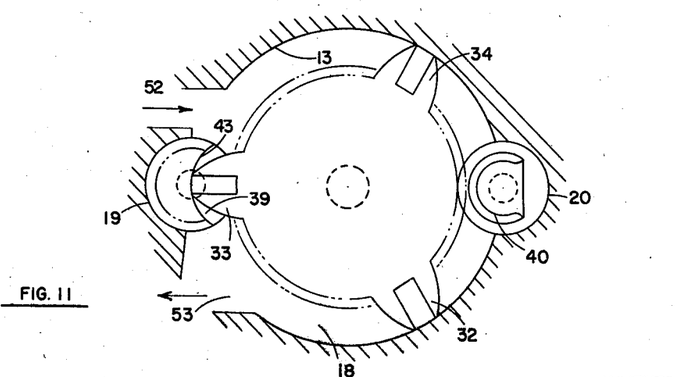

The sequential operation of the engine may be seen by reference to FIGURES 9, 10 and 11 as well as to FIGURE 3. As the master rotor 14 has turned in the forward direction (i.e., clockwise as the engine is illustrated to the position of FIGURE 9, there has been compression forwardly of the lobe 32. This is because the air in the chamber 18 ahead of the lobe 32 is trapped between this lobe and the valve rotor 20. As the lobe 32 approaches the valve rotor 20 (the position of FIGURE 9), the latter element is positioned by its rotation so that the entrance to the recess 40 in the rotor 20 is opened into communication with the chamber 18 ahead of the lobe 32. This permits the compressed air ahead of the lobe 32 to enter the recess 40.

As the lobe 32 then moves into the recess 40, as shown in FIGURE 3, the side edges 49 and 50 of the recess 40 close against the edge of the lobe 32, trapping the compressed air within the recess 40. There is space within this rotor to receive the compressed air in view of the distance between the end surfaces 46 and 47 and the spacing of the arcuate surface 48 beyond the tip of the lobe.

The parts then continue to move to the position of FIGURE 10. There, the entrance to the recess 40 again is brought into communication with the chamber 18. This communication, however, now is to the rear of the lobe 32. Thus, the compressed air first was on the forward side of the lobe 32, but as the lobe 32 passes the rotor 20 the compressed air is shifted to the rearward side of the lobe 32. A seal is maintained along the periphery of the rotor by the meshing teeth 35 and 37 so that the compressed air is trapped between the lobe 32 and the rotor 20. As the lobe 32 passes the fuel inlet line 54, a charge of fuel is injected. This mixes with the air in back of the lobe 32, resulting in a combustible mixture which is fired by the plug 55. The resulting explosion drives the lobe 32 forwardly as the combustion gases are prevented from movement in a rearward direction by the rotor 20, which closes off at the recess 40 as the rotor 20 continues its counterclockwise rotation. This drives the master rotor forwardly, in the clockwise direction as the device is shown, providing the power stroke for the engine. There is a slight decompression of the air as the rotor leaves the pocket formed by the recess 40 in the rotor 20, but it is still in a compressed condition when the fuel injection and ignition take place.

Each of the lobes acts in the same manner as that described for the lobe 32. Thus, when the lobe 33 passed the rotor 20, it also carried with it compressed air with which was mixed fuel from the line 54 which was ignited by the plug 55. Therefore, as the engine is shown in FIGURE 9, there are expanding combustion gases behind the lobe 33. Consequently, as the lobe 32 passes the plug 55 and is driven in its power stroke, it also exhausts the combustion gases which are ahead of it. These gases leave the chamber 18 through the port 53 as the lobe 33 passes this port. Thus, at the same time as a lobe serves as the means for providing an impetus to the master rotor 14, it also provides the means for scavenging the chamber 18, driving the exhaust gases from the last power stroke ahead of it and out of the exhaust port.

The exhaust gases must leave through the outlet port 53 because these gases cannot pass the scavenge rotor 19. Initially, the scavenge rotor is positioned with its teeth 36 meshing with the master rotor teeth 35 and the recess 39 facing away from the exhaust zone (FIGURE 9). Subsequently, the rotor 19 is turned so that the lobe of the master rotor enters the recess 39 and continues to block movement of the exhaust gases in the forward direction. There is some mixing of air with the exhaust gases as the lobe enters the recess 39, which helps control any harmful exhaust emissions of the engine. This occurs from the small amount of air which is within the recess 39 that opens into the zone occupied by the exhaust gases as the rotor 19 turns to accept the lobe that advances toward it.

As each lobe compresses the gases prior to the combustion as the fuel is injected, it also draws air into the chamber 18 behind it. As shown in FIGURES 9, 10 and 11, air is being sucked into the chmber 18 in back of the lobe 34. The scavenge rotor 19, the teeth 36 of which mesh with the teeth 35 of the master rotor, blocks communication between the incoming air and the exhaust gases on the opposite side of the scavenge rotor. This intake of air continues until the lobe approaches the valve rotor 20, and the next lobe passes the scavenge rotor to move beyond the inlet port 52. As seen in FIGURE 11, therefore, the lobe 33, by a few degrees of additional rotation of the master rotor, will pass the port 52 and begin to compress the air that is being drawn into the chamber 18 behind the lobe 34.

Consequently, in one rotational cycle of the engine, there is compression, ignition, expansion and exhaust and a full four-cycle engine operation is completed. This drives the master rotor 14 continually forwardly in the direction indicated as a fresh charge is drawn into the engine with the passing of each lobe over the intake port 52. The result is a smooth flow of power from the engine, which accomplishes its complete cycle with only three moving parts, all of which turn at a steady speed. No reciprocating motion is necessary in the operation of this engine.

This arrangement also allows the engine to run as a turbine with continuous fuel injection and ignition. Moreover, a carburetor may be used in lieu of the fuel injection design shown. If designed to the proper compression ratio, the engine can operate on the diesel principle.

The scavenge rotor 19 can be eliminated provided a blower is included with proper porting to serve the function of displacing the burned gases with air.

With the rotary parts moving in circular chambers and without eccentric motion, the sealing arrangement for the engine of this invention is greatly simplified and made more effective. It is possible to provide a seal which is both efficient and is not subject to undue wear at each location of potential pressure loss. In fact, for smaller engines where efficiency is not a prime objective, all seals may be eliminated.

Figures 13, 14, 21:
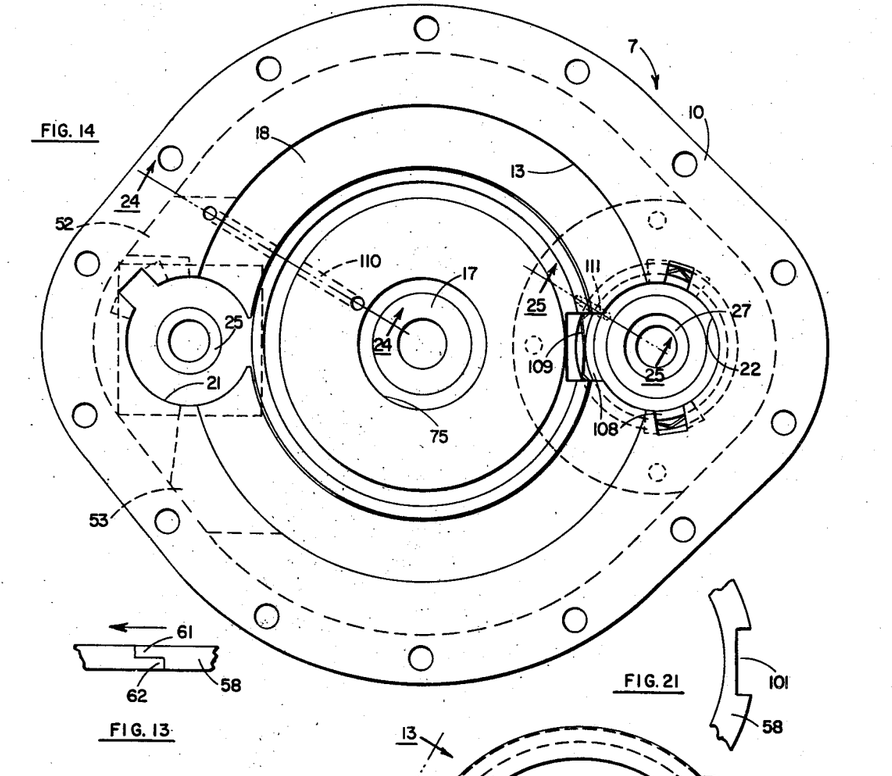
FIGURE 13 is a fragmentary elevational view taken along line 13—13 of FIGURE 12, showing the overlapping relationship of the ends of the split sealing ring of FIGURE 12.
FIGURE 14 is a plan view of one section of the housing with the rotors and seals removed, with the exception of the seals at the end of the valve rotor.
FIGURE 21 is a fragmentary plan view of the seal that engages the radial face of the master rotor, illustrating the notch to receive the seal of FIGURES 19 and 20.

Around the periphery of the master rotor 14 adjacent its radial faces are sealing rings 57 and 58 (see FIGURE 2). These fit within recesses in the inner surfaces of the radial end walls 11 and 12. These rings are biased inwardly toward the rotor by means of undulant springs 59 and 60. The rings 57 and 58 are split, with overlapping end sections to minimize pressure losses and to avoid interference with rotation of the rotor 14. Thus, as seen in FIGURE 13 for the ring 58, the two ends of the ring include projecting elements 61 and 62 that overlap with rotation of the rotor being in the direction of the arrow in this figure.

Figure 15:
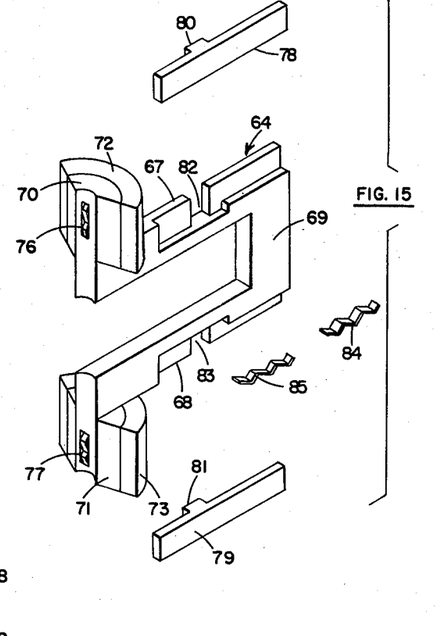
FIGURE 15 is an exploded perspective view of the seal carried by the master rotor.
Figure 16:
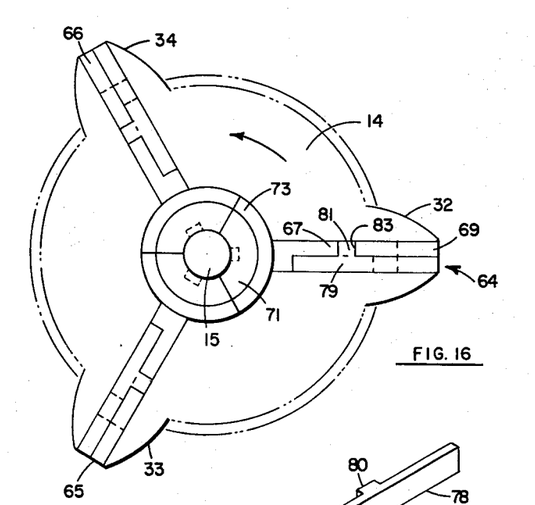
FIGURE 16 is a plan view of the master rotor, with its seals installed.

In addition, there are three seals 64, 65 and 66 that extend radially of the master rotor and provide a seal against the wall of the chamber 18 at each of the lobes 32, 33 and 34. These three seals are identical, with the seal 64 being shown in perspective in FIGURE 15.

The sealing element 64 is generally U-shaped, including two parallel legs 67 and 68 that are received within generally complementary radial slots in the rotor. An outer end section 69 interconnects the legs 67 and 68. An arcuate portion 70 is at the end of the leg 67, and a similar arcuate portion 71 and the end of the leg 68. On the outsides of the arcuate portions 70 and 71 are complementary arcuate elements 72 and 73 of bearing material. When installed, the arcuate elements 70 and 71 and the bearing segments 72 and 73 of the seals are adjacent the rotor shaft 15, being received in complementary recesses 74 and 75 in the housing end walls 11 and 12 (see FIGURE 2).

Undulant sheet metal springs 76 and 77 are included at the arcuate end sections 70 and 71 adjacent the rotor shaft 15, biasing the seal outwardly in the radial direction. This maintains the outer end section 69 of the seal adjacent the circumferential wall of the chamber 18 during start-up and low-speed operations. At other times, centrifugal force provides the same effect, while the bearing elements 72 and 73, being restricted by the walls of the recesses 74 and 75, limit the radial outward movement of the seal. In this manner, the seals are positioned so that they are closely adjacent the circumferential wall of the chamber 18 to prevent the passage of air and combustion gases past the tips of the lobes 32, 33 and 34.

The seals 64, 65 and 66 also seal against the radial walls of the housing, preventing fluid from traveling past the lobes along the radial housing surfaces. As may be seen in the perspective view of FIGURE 15, the legs 67 and 68 of the seal 64, which extend radially when the seal is assembled, are noticed along their outer surfaces. This is to receive separate longitudinal sealing members 78 and 79. These sealing members include lateral projections 80 and 81 which fit into slots 82 and 83 in the legs 67 and 68. This locks the sealing members 78 and 79 against movement radially outwardly so that the ends of these sealing members do not extend beyond the end of the outer leg 69. Beneath the sealing members 78 and 79 are undulant springs 84 and 85. These bias the members 78 and 79 toward the radial surfaces of the walls 11 and 12 along the boundaries of the chamber 18. Consequently, there is a seal against the passage of gases between the radial surfaces of the master rotor 14 and the chamber.

Figure 17:
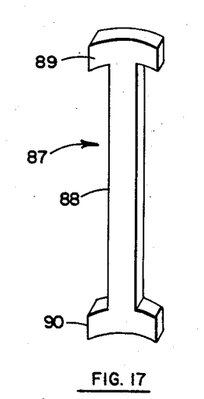
FIGURE 17 is an enlarged perspective view of the seal for the scavenger rotor.
Figures 18, 20:
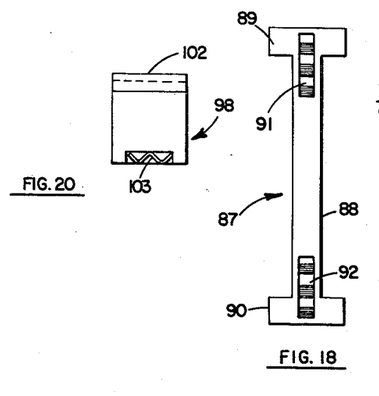
FIGURE 18 is a side elevational view of the seal of FIGURE 17.
FIGURE 20 is a side elevational view of the seal of FIGURE 19.

A seal for the scavenge rotor is provided at the periphery of that element within the recess 21 in the housing that receives this rotor. This seal 87, shown in FIGURES 17 and 18, includes a longitudinal portion 88 at the ends of which are arcuate sections 89 and 90. When installed, the end sections 89 and 90 lie alongside the circumferential surface of the scavenge rotor 19 adjacent either end and beyond the central portion and its gear teeth 36. The seal 87 is pressed toward the periphery of the rotor 19 by means of undulant springs 91 and 92.

Because of the higher pressure existing at the valve rotor 20, the sealing normally is more extensive than at the scavenge rotor 19. If desired, the additional sealing may be provided at the scavenge rotor as well as at the valve rotor, although normally this is not required. The circumferential periphery of the valve rotor is sealed by a pair of spaced spring-biased sealing members 94 and 95, which are similar to the seal 87 for the scavenge rotor. Thus, the sealing members 94 and 95 include arcuate end sections which lie against the circumference of the valve rotor beyond the gear teeth 37.

Figure 19:
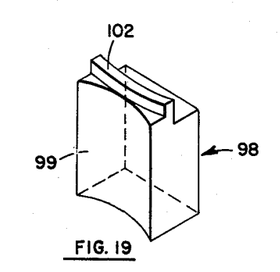
FIGURE 19 is a perspective view of one of the seals used for the valve rotor.
Figure 22:
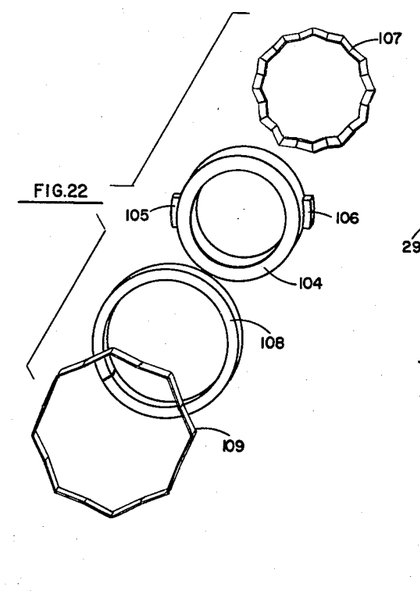
FIGURE 22 is an exploded perspective view of the seal assembly at the end of the valve rotor.

Two additional seals are provided for the inner portion of each of the circumferential end parts of the valve rotor 20. These sealing members 97 and 98 are shorter and wider than the seals 94 and 95, and there is no interconnecting portion extending between them. They are received in grooves at the portion of the recess 22 adjacent the master rotor 14. They are identical, with the sealing member 98 being shown in perspective in FIGURE 19. It includes an arcuate inner surface 99 for bearing against the cylindrical portion of the periphery of the valve rotor beyond the gear teeth 37, against which it is urged by an undulant spring 100. The annular sealing ring 58 includes a notch 101 (FIGURE 21) to receive an upward projection 102 of the sealing member 98, so that this projection of the sealing member forms a continuation of the circumference of the sealing ring 58. An additional undulant spring 103 biases the member 98 axially inwardly so that it bears against the radial surface of the rotor 14 and assists the annular seal 58 at the location of the seal 98.

Figures 12, 24:
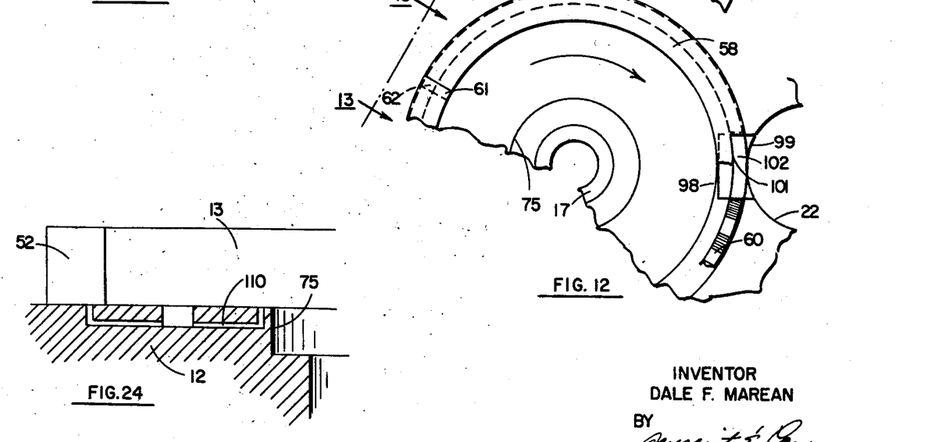
FIGURE 12 is a fragmentary plan view illustrating the arrangement of the seal that engages the radial surface of the master rotor.
FIGURE 24 is a fragmentary sectional view taken along line 24—24 of FIGURE 14, illustrating a vent for leakage gases.
Figure 23:
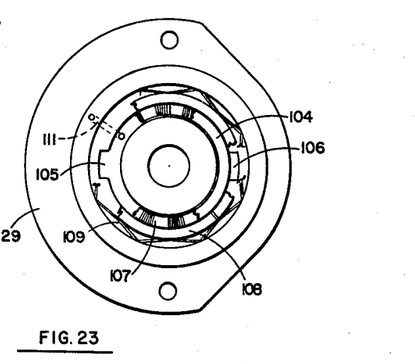
FIGURE 23 is a plan view, partially broken away, of the seal assembly of FIGURE 22 as installed.

At the radial end surfaces of the valve rotor 20 are additional seals, as illustrated in FIGURES 23 and 24. This includes a sealing ring 104, which is provided with outwardly projecting lugs 105 and 106 that extend into recesses in the housing to lock the ring 104 against rotation. An undulant spring 107 biases the ring 104 axially inwardly toward the radial end wall of the valve rotor. A similar annular seal is provided at the opposite end of the valve rotor 20.

Circumscribing the annular seal 104 inwardly of the lugs 105 and 106 is a split ring seal 108. This element is biased inwardly to tightly grip the circumference of the sealing ring 104 by means of an annular undulant spring 109. A similar arrangement is located at the opposite end of the valve rotor 20. Thus, the valve rotor is effectively sealed along its circumferential surface and at its radial ends as well.

Figure 25:
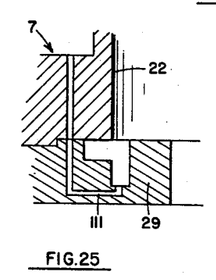
FIGURE 25 is a fragmentary sectional view taken along line 25—25 of FIGURE 14, illustrating another vent passage.

While the seals effectively preclude any substantial leakage of gases around the rotating parts, the housing is ported to allow what minor amount may escape to be dissipated harmlessly. Thus, as seen in the sectional view of FIGURE 24, a small port 110 is provided between the location adjacent the drive shaft 15 and the inlet port 52. A smiliar passageway 111 vents the area around the valve rotor to the space beneath the annular sealing ring 58, as illustrated in FIGURE 25. The opposite end portion of the housing is similarly vented.

FIGURE 26 illustrates a modification of the invention as used for a compressor, rather than as an engine. This view illustrates the parts within the housing, with one segment of the housing removed. The housing 113 includes a circular chamber 114 in which rotates a master rotor 115 that is provided with two lobes or vanes 116 and 117. A single secondary rotor 118 is similar to the scavenge rotor 19 of the embodiment previously described. It is received within a recess 119 in the housing 113, which has a cross section defined by a segment of a circle. An inlet port 120 is one one side of the rotor 118, and an outlet port 121 on the other side. As before, gear teeth are provided on the rotor 118 to mesh with those on the master rotor 115, and a recess 122 is formed in the rotor 118. As the rotor 115 turns, air is compressed forwardly of the vanes 116 and 117 and is swept through the chamber 114 from the inlet 120 to the outlet 121. The rotor 118 separates the inlet port from the outlet port 121. While the compressor efficiently provides a flow of outlet air at the discharge port 121, it has the advantage of having no rigid element against which the compression is made as in a conventional reciprocating compressor. Hence, it may be used for installations, such as refrigeration systems, where liquid at times may be encountered within the compressor without danger of damaging the parts as will occur when liquid appears in a conventional reciprocating compressor.

The foregoing detailed description is to be clearly understood as given by way of illustration and example only, the spirit and scope of this invention being limited solely by the appended claims.

What is claimed is:

1. In a rotary engine of the type including a housing having two laterally spaced end walls and a connecting circumferential wall that cooperatively define a circular chamber wherein an externally toothed first rotor of substantially smaller diameter is rotatably supported on a transverse shaft that is journaled in bearings positioned in said end walls, an air inlet port and a gas discharge port in circumferentially spaced relationship which extend through said wall and communicate with the ambient atmosphere and first and second portions of a circumferentially extending space defined between the external surface of said first rotor and the interior surfaces of said end walls and circumferential wall, a second toothed rotor of substantially smaller diameter than that of said first rotor rotatably supported within said housing opposite said two ports and in toothed sealing engagement with said first rotor, and in which second rotor a compressed air-receiving recess is formed, sealing means within said housing located between said two ports and in engagement with said first rotor, which sealing means and second rotor cooperate with said first rotor and housing to divide said space into said first and second portions, gear means for causing said first and second rotors to rotate in synchronized relationship, the improvement that imparts a smooth flow of power from said first rotor to said shaft as said first rotor is rotated, which improvement comprises:

(a) first, second and third equally spaced vanes that project from said first rotor, with each of said vanes having forward and rear faces;

(b) first means adjacent said second rotor for sequentially injecting charges of fuel into said second portion of said space;

(c) second means for igniting each of said charges of fuel after it has been injected into said second portion of said space; and (d) third means on each of said vanes that slidably seals with the interior surfaces of said end walls and said circumferential wall, with said forward face of said first vane as it moves past said air inlet port towards said second rotor compressing a first charge of air in said first portion of said space that is transferred to said recess in said second rotor as said first vane moves through said recess and in sealing engagement therewith, with said first charge of compressed air being released from said recess upon the completion of the movement of said first vane therethrough to flow into said second portion of said space to be momentarily contained between said second rotor and said rear face of said first vane during which time said compressed air mixes with a charge of said fuel, which mixture is then exploded by said ignition means and said exploded air-fuel mixture thereafter expands to drive said rotor and first vane in a direction to permit said exploded mixture to escape through said discharge port as said first vane moves thereby, with the shock of said exploding mixture on said first rotor being cushioned by said second vane that compresses a second charge of air between it and said second rotor as said first vane and rotor rotate towards said discharge port, and said second charge of said air-fuel mixture as it explodes rotating said rotor and third vane to compress a third charge of air that is subsequently mixed with a third charge of fuel and exploded in the same manner as said first and second charges thereof.

2. A rotary engine as defined in claim 1 wherein said exhaust port, second rotor, and ignition means are so disposed relative to one another that said second charges of said air-fuel mixture are exploded concurrently with the initial venting of said exploded first charges from said discharge port or shortly thereafter.

3. A rotary engine as defined in claim 2 wherein said second means comprises an electrically operated device mounted in an opening formed in said housing and in communication with said second portion of said space.

4. A rotary engine as defined in claim 3 wherein said electrically operated device comprises a spark plug.

5. A rotary engine as defined in claim 1 wherein said sealing means comprises a rotating member.

6. A rotary engine as defined in claim 1 wherein said sealing means comprises a third externally toothed rotor in engagement with said first rotor, in which third rotor a recess is formed through which each of said first, second, and third vanes may move as said first and third rotors rotate.

References Cited

UNITED STATES PATENTS

| | | |
|---|---|---|
| 926,641 | 6/1909 | Coffey et al. |
| 1,268,794 | 6/1918 | Harris et al. |
| 2,722,201 | 11/1955 | Muse. |
| 2,920,814 | 1/1960 | Breelle _______ 230—150 |
| 2,956,735 | 10/1960 | Breelle _______ 230—150 |

WILLIAM L. FREEH, Primary Examiner

W. J. GOODLIN, Assistant Examiner